United States Patent Office 3,567,691
Patented Mar. 2, 1971

3,567,691
MALEINIZATION OF SYNTHETIC RUBBER
Adriaan W. van Breen, Pieter Luijk, Jacobus M. Rellage, and Christiaan Vervloet, Delft, Netherlands, assignors to Shell Oil Company, New York, N.Y.
No Drawing. Filed Apr. 7, 1967, Ser. No. 629,117
Claims priority, application Netherlands, May 24, 1966, 6607078
Int. Cl. C08d 5/02
U.S. Cl. 260—78.4
8 Claims

ABSTRACT OF THE DISCLOSURE

Conjugated diene homopolymers having improved green strength properties and satisfactory vulcanizate properties are prepared by masticating a solvent free polymer at 50–300° C. and injecting during mastication a solution of maleic anhydride in an amount of 0.01–1 phr.

---

This invention relates to a process for the preparation of reaction products of a synthetic diene rubber with maleic anhydride. By "synthetic diene homopolymer rubber" is meant in the present specification and claims a synthetic elastomeric homopolymer of a conjugated diene hydrocarbon.

The preparation of reaction products of a rubber with maleic anhydride is known per se. For example, the maleinization of rubber in a hydrocarbon solvent in the presence of a peroxide as catalyst is known. The maleinization of rubber in the dry state in the absence of solvents and catalysts is also known.

If a synthetic diene rubber is subjected to a maleinization process, the resultant reaction product is shown to contain a quantity of cross-linked material as an undesirable by-product. This is known as "tight gel," and consists of strongly cross-linked clusters of rubber molecules present in the maleinized rubber and which behave as an undesirable filler. In contrast to a reinforcing filler, such as carbon black, this tight gel does not improve the strength properties of the rubber, but instead hinders the homogeneous dispersion of the conventional rubber additives, such as carbon black, extender oils, and vulcanization agents in the maleinized rubber mass.

It has been shown that maleinization of synthetic diene rubbers renders it possible to improve the strength properties of the still unvulcanized rubber (the so-called "green strength"). This is an attractive property of these reaction products with maleic anhydride, since the green strength of unmodified synthetic diene rubbers, particularly of cis 1,4-polyisoprene which have become available in recent years, leaves something to be desired. This poor green strength is shown, inter alia, in a poor processability in the conventional rubber mixers. As described above, however, the maleinization of the synthetic rubbers in question is accompanied by the formation of tight gel, so that the price for the improvement in processability of the resultant product is a difficult homogeneous dispersion of the conventional rubber additives, with the result that the optimum properties of the vulcanizate are not achieved.

It has already been proposed to suppress the formation of undesirable cross-linking reactions in the maleinization of synthetic rubbers in the dry state and in the absence of peroxides, by operating in the presence of relatively large quantities of inhibitors, which suppress the free radical polymerization; in this process quantities of gel inhibitor between 1 and 10 parts by weight per 100 parts by weight of rubber are used.

In accordance with the present invention, a new process has now been found for the maleinization of synthetic diene homopolymer rubber, in which the said large quantities of inhibitor are avoided and which nevertheless yields reaction products which contain no or substantially no tight gel. According to the invention, reaction products are prepared from a synthetic diene homopolymer rubber with maleic anhydride by feeding the essentially solvent-free synthetic rubber to a mixer, in which the rubber mass is contacted during mastication at a temperature between 50° C. and 300° C. with solution of maleic anhydride which is injected into the mixer, and the rubber mass is allowed to react with 0.01–1 part by weight of maleic anhydride per 100 parts by weight of rubber.

By "mastication" of rubber is meant in the present specification and claims the subjection of rubber to shearing forces, accompanied by scission of the rubber chains.

The mastication residence time, during which adduct formation is effected may vary from about 30 seconds to about 30 minutes, but 2–10 minutes is the preferred effective range. While mastication may be continued beyond 30 minutes for some special purpose (such as incorporation of fillers, oil, etc.), this is not necessary for adduct formation.

As synthetic rubber with the present process any elastomeric homopolymer of a conjugated diene hydrocarbon can in principle be used. Examples are the stereo-specific rubbers cis 1,4-polybutadiene and cis 1,4-polyisoprene. In particular with cis 1,4-polyisoprene, which can be regarded as the synthetic equivalent of natural rubber, but which in the unvulcanized state has been found to have less satisfactory strength properties than natural rubber, the advantages of the present process are particularly evident, as will be further illustrated with reference to the examples.

In the maleinization process according to the invention objectionable gel formation, occurring in the form of a tight gel, is prevented. The resultant products are therefore shown to have a greatly improved processability, and it is also seen that the good vulcanizate properties, compared with those of the unmodified rubber, are fully retained, and in some cases are even improved in respect of the heat development under dynamic load (heat build-up). This will be illustrated in more detail by means of the examples.

The synthetic rubber may be supplied mixed or unmixed with an extender oil. A rubber cement or rubber solution as feed is naturally unsuitable for the purposes of the present invention, since the rubber is then insufficiently or not at all masticated in the mixer. For this reason the quantity of extender oil to be used is determined by the condition that a cement or solution is unusable as rubber feed in the present process. The rubber feed can, of course, also contain the conventional rubber additives such as an anti-oxidant (usually in quantities of 0.25 phr.) and fillers.

Mixers such as those of the Banbury type may be used, as well as continuous mixers of more complicated types. A continuous mixer consists essentially of a supply and transportation zone with feed orifice, into which, according to the process of the present invention, rubber is supplied and in which it is plastified, and a mixing zone through which the rubber mass is transported being simultaneously subjected to shearing forces. This causes the rubber mass to be masticated and a solution of maleic anhydride in a suitable solvent is supplied to this mass, which solvent is dispersed through the rubber mass. This causes the maleinization to take place, whereupon the maleinized product can be taken off.

The use of a continuous screw extruder as continuous mixer has been found to be very suitable in the process according to the present invention.

Such a machine is provided with a feed opening and an extrusion orifice. There may, of course, also be more than one extrusion orifice. Various zones can be distinguished in the machine, viz. a supply zone and a transportation zone with a transport screw having a constant pitch, in which a certain compression of the rubber mass simultaneously takes place. The rubber mass subsequently passes a restriction formed by a blister in which the mass is subjected to high shearing forces and subsequently passes into a mixing zone in which the screw is provided with mixing elements. Beyond this mixing zone is a transportation zone through which the product is discharged via the extrusion orifice. The first transportation zone in the present case serves therefore principally as a plastification zone, and mixing and second transportation zones serve principally as mastication zones for the rubber mass. At the beginning of the mixing zone an injection opening is provided in the barrel of the extruder for the injection of a solution of maleic anhydride into the masticated rubber mass which is present in the barrel. The synthetic diene rubber is supplied through the feed opening to the extruder and is plastified in the first transportation zone. This plastified mass subsequently passes the blister and flows into the mixing zone. The solution of maleic anhydride is subsequently injected into the rubber mass through the injection opening and is intimately mixed with the rubber mass in the mixing zone. The maleinized product is finally extruded from the extrusion orifice.

The Revue Générale du Caoutchouc, 39 No. 10 (1962), pages 1561–1576 contains a survey, in which mention is made of suitable types of transporting mixers for use with the method according to the invention. Particularly suitable are the Ko-Kneaders, described and illustrated on pages 1570–72, as designed by Buss A.G. (Basel).

The masticated rubber mass is contacted with the maleic anhydride solution at a temperature between 50° C. and 300° C. If the reaction temperature is chosen below 50° C., objectionable gelling takes place in the synthetic rubber mass; above 300° C. an excessive scission of the rubber molecules takes place. It is preferred to choose a reaction temperature between 150° C. and 250° C. and in general the best results are obtained at temperatures between 200° C. and 250° C. In these temperature ranges a rapid maleinization of the synthetic rubber mass is effected without objectionable gelling and without a harmful scission of the rubber molecules.

The rubber mass is allowed to react in the continuous mixer with at least 0.01 phr. (=parts by weight per 100 parts by weight of rubber) of maleic anhydride, and preferably with not more than 2.5 phr. of maleic anhydride. The maleic anhydride is supplied as a solution in an organic solvent which is inert under the recited maleinization conditions, for example as a 1–25% (wt.) (preferably 3–10%) solution in aliphatic ketones such as methylethylketone or acetone, chlorinated aliphatic hydrocarbons such as chloroform or aromatic hydrocarbons such as toluene, or mixtures of the same. It is preferred to react the rubber mass with not more than 1.0 phr. of maleic anhydride. Quantities of maleic anhydride between 0.05 and 0.5 phr., particularly between 0.1 and 0.3 phr., have been shown to be very suitable for reacting with the rubber mass. It was found that below 0.01 phr. of maleic anhydride only a slight improvement of the strength properties of the maleinized product in the unvulcanized state is obtained.

It is also possible with the process according to the invention to make a masterbatch of maleinized rubber, i.e., a rubber which has reacted with more maleic anhydride than is desirable for the final product. This masterbatch is then extended with non-maleinized rubber to form the desired mixture.

The resultant maleinized rubbers can be processed in a manner known per se by molding and vulcanization to articles such as tires, driving belts, hoses, tubes, insulation material, shock absorbers, etc.

EXAMPLE I

In this example the influence of the maleic anhydride concentration on the properties of the resultant product was examined. For this purpose use was made of a screw extruder, as described in the foregoing. The length of the screw extruder was 21 times the diameter. The worm-screw section, composed of the supply zone and the first transportation zone, had a length of 10×the diameter D and a compression ratio of 1:1.5; the blister had a length of 1×D; the mixing zone had a length of 5×D; the second transportation zone had a length of 5×D and a compression ratio of 1:3; the diameter D was 60 mm.

A feed in the form of strips of cis 1,4-polyisoprene was fed into the feed opening. The cis 1,4-polyisoprene had a cis 1,4-content of 92% and an intrinsic viscosity (I.V.) of 6 dl./g. A solution of maleic anhydride (MA) in chloroform, or at the highest maleic anhydride concentration in acetone, was injected through the injection opening. By making the weight ratio MA/solvent variable, it was possible to ensure that the same quantity of solvent was introduced for all MA-concentrations. The temperature of the rubber mass on contact with the MA-solution was invariably approximately 150° C.

Rubber mixtures having the following compositions were made from the resultant maleic anhydride (MA) adduct or the non-maleinized rubber as blank.

TABLE I

| | Parts by weight |
|---|---|
| Rubber-MA adduct or rubber (blank) | 100 |
| HAF-carbon black | 50 |
| Zinc oxide | 5 |
| Stearic acid | 3 |
| Anti-oxidant (N - phenyl-N'-isopropyl-p-phenylenediamine) | 2 |
| Accelerator (N-cyclohexyl-2-benzothiazole sulphenamide) | 0.8 |
| Sulphur | 2.25 |

The properties of the unvulcanized rubber mixture as shown in Table II were determined as follows:

(1) A small slab (ASTM tensile slab) was pressed from the unvulcanized rubber mixture according to the method described in ASTM–D–15–64, T, part B. Conditions: T=80° C., t=5 minutes, p=approximately 50 atm.

(2) Rectangular strips with a width of 25 mm. were punched from this slab, which had a thickness of approximately 2 mm.

(3) The stress/strain diagram was determined approximately 24 hours after the test slab had been pressed. Use was made of a tensile testing machine free from inertia. The test piece was clamped into the machine at a clamping distance of 50 mm. and stretched at a speed of 500 mm.min.$^{-1}$ (=1000% min.$^{-1}$).

(4) From the stress/strain diagram the following calculations were made using the width and thickness of the test piece:

(a) the maximum stress exerted on the piece
(b) the strain corresponding with the moment of maximum stress (corresponding strain)
(c) the ultimate elongation at break.

The rubber mixture was vulcanized for 20 minutes at 145° C. A number of properties, which are shown in Table II, were also determined from the resultant vulcanizate. The vulcanization time in this example and in the following examples was invariably the optimum vulcanization time at 90% modulus plateau, determined with a Monsanto rheometer, angle of oscillation 3°, frequency 3 strokes/minute.

TABLE II

| Reaction conditions: | | Chloroform | | | | Acetone | |
| --- | --- | --- | --- | --- | --- | --- | --- |
| Solvent | | | | | | | |
| MA/solvent, weight | 1:240 | 1:120 | 1:60 | 1:30 | 1:15 | 1.5:1 | |
| Polymer, bound MA, phr | 0.06 | 0.12 | 0.24 | 0.40 | 0.9 | 2.5 | |
| Unvulcanized rubber mixture: | | | | | | | |
| Hoekstra plast., 100° C., HU | 0.71 | 0.63 | 0.65 | 0.74 | 0.71 | 0.97 | 0.53 |
| Maximum stress, kg./cm.$^2$ | 5.5 | 11.0 | 14.0 | 18.0 | 25.0 | 34.0 | 3.0 |
| Corresponding strain, percent | 1,200 | 700 | 800 | 775 | 700 | 510 | 60 |
| Ultimate elongation, percent | 1,200 | 700 | 800 | 775 | 700 | 510 | 280 |
| Vulcanization:[1] | | | | | | | |
| Tensile strength, kg./cm.$^2$ | 240 | 235 | 230 | 235 | 245 | 225 | 255 |
| Modulus, 300, kg./cm.$^2$ | 140 | 145 | 145 | 150 | 160 | 135 | 120 |
| Elongation at break, percent | 480 | 460 | 440 | 460 | 450 | 490 | 560 |
| Heat build-up, ° C | 20 | 22 | 21 | 21 | 21 | 22 | 22 |

[1] The tensile strength, modulus 300% and elongation at break of the vulcanizate were determined according to ASTM-D-412 (die/C); the heat build-up was determined according to ASTM-D-623 (Goodrich method).

In the right hand column the corresponding values for the non-maleinized product have been included as blank. The values obtained show that even with minor MA-concentrations a considerable improvement of the tensile strength and of the elongation of the unvulcanized rubber mixture is found (and accordingly a considerably improved processability), while the values obtained for the vulcanizates show that this did not take place at the cost of the properties of the vulcanizate.

EXAMPLE II

In this example the influence of the temperature of the rubber mass, which is contacted with the MA-solution, was examined. Use was made of the same screw-extruder as described in Example I. Once again a feed in the form of strips of cis 1,4-polyisoprene was used. A MA-solution in chloroform was continuously injected through the injection opening, the MA/solvent weight ratio being 1:30. The rubber mixture had again the same formulation as shown in Table I of Example I. In preparing the vulcanizate a vulcanization temperature of 145° C. and a vulcanization time of 20 minutes were used.

TABLE III

| Reaction conditions, reaction temperature, ° C | 120 | 150 | 175 | 310 | 260 | |
| --- | --- | --- | --- | --- | --- | --- |
| Polymer, bound MA, phr | | | 0.3 | | | |
| Unvulcanized rubber mixture: | | | | | | |
| Hoekstra plast. 100° C., H.U | 0.62 | 0.56 | 0.49 | 0.55 | 0.43 | 0.53 |
| Mooney viscosity 100° C.,[1] M.U | 72 | 81 | 73 | 71 | 61 | 71 |
| Maximum stress, kg./cm.$^2$ | 15 | 16 | 15 | 30 | 34 | 3.0 |
| Corresponding strain, percent | 790 | 760 | 840 | 990 | 890 | 60 |
| Ultimate elongation, percent | 790 | 760 | 840 | 990 | 890 | 280 |
| Green energy,[2] joules/cm.$^3$ | 7 | 7 | 7 | 13 | 14 | 0.7 |
| Vulcanizate: | | | | | | |
| Tensile strength, kg./cm.$^2$ | 210 | 230 | 230 | 255 | 240 | 255 |
| Modulus, 300%, kg./cm.$^2$ | 140 | 160 | 150 | 160 | 150 | 120 |
| Elongation at break, percent | 430 | 410 | 460 | 500 | 490 | 560 |
| Heat build-up, ° C | 21 | 20 | 19 | 19 | 19 | 22 |

[1] According to ASTM-D-1646 (ML 1+4).
[2] By "green energy" is meant the energy required to cause the test piece to break; this is obtained by integration of the tensile-strain curve of the unvulcanized rubber mixture and is expressed in joules/cm.$^3$.

The column at the right again relates to the properties of the non-maleinized product. The data obtained in these tests show that a distinct improvement of the strength properties of the unvulcanized rubber mixture composed from the MA-adduct is obtained with all the reaction temperatures examined. With reaction temperatures above 200° C. this improvement is very pronounced. The MA-adducts obtained in this process also give vulcanizates having strength properties which retain at a high level, and having a heat build-up which is even not unconsiderably lower.

EXAMPLE III

In this example comparative tests were made to investigate which products were yielded by a number of different synthetic diene rubbers, when the rubbers were maleinized with the process according to the invention. The continuous mixer used was the screw extruder described in Example I. In each case a solution of maleic anhydride in acetone with a MA/solvent weight ratio of 1:16 was used, while the temperature of the rubber mass which was contacted with the MA-solution was invariably 130° C.

The following rubbers were examined:
A styrene-butadiene rubber with a styrene content of 23% by weight, obtained by an emulsion polymerization and indicated hereinafter by SBR.

A cis 1,4-polyisoprene rubber having a cis 1,4-content of 92% and extended with 20% by weight of napthenic oil, indicated hereinafter by IR(I).

A cis 1,4-polyisoprene rubber having a cis 1,4-content of 98% indicated hereinafter by IR(II).

Mixtures were compounded from the non-maleinized rubber as blank, as well as from the corresponding MA-adduct, the compositions being as shown in the following Table IV.

TABLE IV

| | SBR | IR(I) | IR(II) |
| --- | --- | --- | --- |
| Polymer or polymer MA-adduct | 100 | | |
| HAF carbon black | 50 | | |
| Zinc oxide | 5 | | |
| Stearic acid | 3 | | |
| Anti-oxidant [1] | 2 | | |
| Paraffin wax | 1.5 | | |
| Accelerator | [2] 1.4 | [1] 0.6 | [1] 0.8 |
| Sulfur | 1.75 | 2.0 | 2.25 |

[1] See Table I.
[2] A mixture of 0.8 part by weight of N-oxydiethylene 2-benzothiazole, sulfenamide and 0.6 part by weight of diphenylguanidine.

The properties of the unvulcanized mixtures given above were examined. The mixtures were subsequently vulcanized and the properties of the vulcanizates thus obtained were then determined. The results obtained are summarized in the following Table V.

TABLE V

| | SBR | SBR-MA | | IR(I) | IR(I)-MA | IR(II)-MA |
| --- | --- | --- | --- | --- | --- | --- |
| Polymer: | | | | | | |
| Hoekstra plast., H.U | 0.35 | 0.26 | 0.60 | 0.54 | 0.54 | 0.50 |
| Bound MA, phr | | 0.55 | | 0.47 | | 0.55 |
| Unvulcanized rubber mixture: | | | | | | |
| Hoekstra plast., 100° C., H.U | 0.41 | 0.42 | | | 0.54 | 0.60 |
| Mooney viscosity, 100° C., M.U | 52 | 56 | 52 | 49 | 65 | 70 |
| Maximum stress, kg./cm.$^2$ | 4.0 | 6.0 | 2.5 | 5 | 2.5 | 10 |
| Corresponding strain, percent | 100 | 100 | 180 | 1,150 | 60 | 1,000 |
| Ultimate elongation, percent | 500 | 650 | 380 | 1,150 | 1,700 | 1,000 |
| Vulcanizate: | | | | | | |
| Vulcanization time at 145° C., min | 35 | 45 | 20 | 18 | 12 | 15 |
| Tensile strength, kg./cm.$^2$ | 260 | 260 | 235 | 235 | 255 | 285 |
| Modulus, 300%, kg./cm.$^2$ | 140 | 160 | 90 | 95 | 145 | 135 |
| Elongation at break, percent | 530 | 460 | 650 | 670 | 480 | 570 |
| Heat build-up, ° C | 46 | 46 | 22 | 19.5 | 23.5 | 20.5 |

The results obtained from the above rubbers also show once again that the strength properties of the maleinized rubbers in the unvulcanized state are considerably improved, while the vulcanizate properties are not adversely affected. A striking feature here is again that the heat inized IR, and on the basis of a good quality natural rubber (RSS III).

The rubber mixtures were subsequently vulcanized for 20 minutes at 145° C. and the properties of the resultant vulcanizates determined.

TABLE VII

|  | IR 0.6 MA ex IR 3.5 MA | IR 0.6 MA direct | IR | NR (RSS III) |
|---|---|---|---|---|
| Unvulcanized mixture: |  |  |  |  |
| Maximum stress, kg./cm.³ | 9.0 | 15 | 3.0 | 15 |
| Corresponding strain, percent | 750 | 1,100 | 60 | 850 |
| Ultimate elongation, percent | 750 | 1,100 | 280 | 850 |
| Vulcanizate: |  |  |  |  |
| Tensile strength, kg./cm.² | 250 | 255 | 255 | 290 |
| Modulus, 300% | 120 | 125 | 115 | 190 |
| Elongation at break, percent | 600 | 550 | 580 | 500 |
| Heat build-up, °C | 21.5 | 18 | 22 | 23 | build-up of the vulcanizates does not deteriorate and even improves in the case of IR-vulcanizates. This indicates clearly that the formation of tight gel is completely or substantially completely suppressed with the method according to the invention.

EXAMPLE IV

In this example the stress-strain properties of a synthetic cis-1,4-polyisoprene rubber, maleinized according to the invention, were compared with a number of non-maleinized rubbers, including a good quality natural rubber. The measurements were in all cases carried out on unvulcanized rubber mixtures containing 50 phr. of HAF-carbon black.

TABLE VI

| Polymer | Stress-strain properties at 23° C. | | Stress-strain properties at 70° C. | |
|---|---|---|---|---|
|  | Green energy (j./cm.³) | Ultimate elongation, percent | Green energy (j./cm.³) | Ultimate elongation at break, percent |
| IR ¹ | 0.5 | 250 | 0.4 | 450 |
| IR (II) ² | 3.0 | 1250 | 0.6 | 500 |
| NR ³ | 7.5 | 700 | 1.0 | 650 |
| IR-MA ⁴ | 6.0 | 900 | 2.0 | 1,000 |

¹ Cis 1,4-polyisoprene having a cis 1,4-content of 92%.
² Cis 1,4-polyisoprene having a cis 1,4 content of 98% (see Example III).
³ Quality of natural rubber: RSS III.
⁴ IR containing 0.3% by weight of MA, made according to the invention.

The properties found indicate that the maleinization according to the invention yields products which are comparable with natural rubber in respect of processability in vulcanized state at 23° C. At 70° C. the maleinized product is indeed clearly superior to the other rubbers examined; the good processability at 70° C. is of particular importance in practice, since 70° C. is a normal processing temperature for rubbers.

EXAMPLE V

This example shows that good results can be obtained with a master-batching technique too, in which a MA-adduct is prepared which contains a quantity of bound MA greater than desired for the final product, whereupon the MA-adduct is diluted with non-maleinized rubber to a product having the desired MA-content.

A MA-adduct having 0.6 phr. of MA was prepared from a synthetic cis 1,4-polyisoprene rubber (IR) having a cis 1,4-content of 92%, in one case by first preparing a MA-adduct having 3.5 phr. of MA by the method according to the invention, and subsequently extending with adduct with non-maleinized IR to an IR having a bound MA-content of 0.6 MA; in another case by preparing an adduct of this kind directly by the method according to the invention. Rubber mixtures were again compounded from the resultant products, and the composition of these mixtures can be read from Table I of Example I. By way of comparison an examination was made of the properties of the same formulations in the basis of the non-male- The data obtained show that good results are achieved even with the masterbatch technique, albeit the direct method is preferred in particular for obtaining a vulcanizate with a low heat build-up.

EXAMPLE VI

In this example the influence of the method of maleinization on the properties of the product was examined. For this purpose three test runs were carried out, two test runs using processes which differ essentially from the process according to the invention and the third test run being carried by the process according to the invention.

In all three cases use was made of a Ko-Kneader of the type PR 46 designed by Buss A.G. (Basel) and described in the article mentioned above in Revue Générale du Caoutchous, 39, No. 10 (1962), pages 1561–1576. This Ko-Kneader had two rows of 20 cams and a row of 24 cams on the barrel and had a length of 36 cm., an average diameter of 4.6 cm. and a speed of 30 to 60 revolutions per minute.

In tests 1 and 2 a solution of maleic anhydride in chloroform and a cis 1,4-polyisoprene rubber having a cis 1,4-content of 92% and an intrinsic viscosity (IV) of 6 dl./g. were simultaneously fed to the feed opening of the apparatus. The MA/solvent weight ratio was 1:10 and the reaction temperature was 20° C.

In test 3 a Buss Ko-Kneader having a liquid injection was used; in this test a MA-solution in chloroform was again used, the MA/solvent weight ratio being again 1:10. The temperature of the rubber mass which was contacted with the injected solution was 50° C. This is relatively low, but this temperature was chosen in order to obtain as satisfactory a comparison as possible with tests 1 and 2 which had a reaction temperature of 20° C.

The rubber mixtures were compounded according to the formulation given in Table I of Example I. The vulcanizates were prepared by vulcanization of the rubber mixtures for 20 minutes at 145° C. The data obtained are summarized in the following Table VIII.

TABLE VIII

|  | Test | | | |
|---|---|---|---|---|
|  | 1 | 2 | 3 | Blank |
| Polymer: |  |  |  |  |
| Bound MA, phr. | 0.25 | 0.50 | 0.50 |  |
| Contact Temperature, °C | 20 | 20 | 50 |  |
| Unvulcanized rubber mixture: |  |  |  |  |
| Maximum stress, kg./cm.² | 15 | 13 | 13 | 3 |
| Corresponding strain, percent | 250 | 300 | 520 | 60 |
| Ultimate elongation, percent | 250 | 300 | 520 | 280 |
| Vulcanizate: |  |  |  |  |
| Tensile strength, kg./cm.² | 175 | 190 | 260 | 255 |
| Modulus, kg./cm.² | 150 | 140 | 125 | 120 |
| Elongation at break, percent | 330 | 350 | 580 | 560 |
| Heat build-up, °C | 29 | 30 | 22 | 22 |

The above data show that in tests 1 and 2 a product was indeed obtained having an improved processability, but that the vulcanizate properties of the products had distinctly deteriorated, as compared with that of the blank, i.e., a vulcanizate on the basis of non-maleinized rubber. In particular the heat build-up reached values which would be unacceptably high in practice. These high values indicate the formation of undesirably large quantities of tight gel. In test 3, in which the MA-adduct was prepared by a method according to the invention, a product having an improved processability was also obtained, but in this case the good vulcanizate properties were completed retained.

In all of the foregoing examples a mastication time of about 5 minutes was utilized.

We claim as our invention:

1. A process for the preparation of an elastomeric reaction product of synthetic isoprene homopolymers with maleic anhydride which comprises:
   (a) feeding the solvent-free elastomeric homopolymer to a mixer;
   (b) masticating the polymer therein at a temperature of 50–300° C. for 1–30 minutes;
   (c) injecting into the masticating polymer 0.01–1 part by weight of maleic anhydride per 100 parts of polymer, said anhydride being dissolved in an inert solvent therefor;
whereby the reaction product is formed.

2. A process as claimed in claim 1, characterized in that a screw extruder is used as a continuous mixer.

3. A process as claimed in claim 1, characterized in that the masticated rubber mass is contacted with the injected maleic anhydride solution at a temperature between 150° C. and 250° C.

4. A process as claimed in claim 3, characterized in that the reaction temperature is between 200° C. and 250° C.

5. A process as claimed in claim 1, characterized in that between 0.05 and 0.5 part by weight of maleic anhydride are reacted with 100 parts by weight of rubber.

6. A process as claimed in claim 1, characterized in that between 0.1 and 0.3 part by weight of maleic anhydride are reacted with 100 parts by weight of rubber.

7. A process according to claim 1, characterized in that the maleinization reaction is carried out in the presence of a compound which produces free radicals.

8. A process according to claim 1, characterized in that the synthetic rubber used is a cis 1,4-polyisoprene having a cis 1,4-content of more than 80%.

References Cited

UNITED STATES PATENTS

| | | | |
|---|---|---|---|
| 2,652,342 | 9/1953 | Gleason | 260—78.4X |
| 2,662,874 | 12/1953 | Brown | 260—79.5 |
| 3,206,432 | 9/1965 | Schwarzer | 260—63 |
| 3,429,952 | 2/1969 | Nordsiek et al. | 260—894 |

JOSEPH L. SHOFER, Primary Examiner

J. KIGHT Assistant Examiner

U.S. Cl. X.R.

260—879, 94.7